United States Patent
Wunderlich (10) Patent No.: US 6,829,652 B1
(45) Date of Patent: Dec. 7, 2004

(54) I2O ISM IMPLEMENTATION FOR A SAN BASED STORAGE SUBSYSTEM

(75) Inventor: Mark W. Wunderlich, Lake Oswego, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/391,200

(22) Filed: Sep. 7, 1999

(51) Int. Cl.[7] .............................................. G06F 15/16
(52) U.S. Cl. ...................... 709/245; 709/229; 709/250; 710/37
(58) Field of Search ................................ 709/246, 217, 709/218, 219, 230, 245, 250, 229; 710/1, 11, 37; 370/469; 703/23, 24, 25

(56) References Cited

U.S. PATENT DOCUMENTS

| | | | |
|---|---|---|---|
| 3,585,306 A | * | 6/1971 | Battocietti |
| 5,568,487 A | * | 10/1996 | Sitbon et al. |
| 5,734,865 A | * | 3/1998 | Yu |
| 5,778,189 A | * | 7/1998 | Kimura et al. |
| 5,787,237 A | * | 7/1998 | Reilly |
| 5,864,738 A | * | 1/1999 | Kessler et al. |
| 5,974,452 A | * | 10/1999 | Karapetkov et al. |
| 6,065,085 A | * | 5/2000 | Odenwald, Jr. et al. |
| 6,112,263 A | * | 8/2000 | Futral |
| 6,128,690 A | * | 10/2000 | Purcell et al. |
| 6,170,025 B1 | * | 1/2001 | Drottar et al. |
| 6,173,374 B1 | * | 1/2001 | Heil et al. |
| 6,226,680 B1 | * | 5/2001 | Boucher et al. |
| 6,321,279 B1 | * | 11/2001 | Bonola |
| 6,330,617 B1 | * | 12/2001 | Bamforth et al. |
| 6,345,301 B1 | * | 2/2002 | Burns et al. |
| 6,421,742 B1 | * | 7/2002 | Tillier |
| 6,466,996 B1 | * | 10/2002 | Bonola |
| 6,522,654 B1 | * | 2/2003 | Small |
| 6,625,158 B1 | * | 9/2003 | Alexander, Jr. et al. |

OTHER PUBLICATIONS

Wright, Maury; Intelligent Ilo: does I2O hold HzO?, EDN access, Mar. 2, 1998.*
Intelligent I/O (I2O) Architecture Specification, version 1.5, pp 1–16 copyright sigth, Mar. 1997.*
Xpoint an dIBM Netfinity® Show I2O based enterprise server solution using 1960RP–Based Artic Card; Xpoint Technolgoies, Oct. 7, 1977.*

* cited by examiner

Primary Examiner—Ajit Patel
Assistant Examiner—Steve Blount
(74) Attorney, Agent, or Firm—Paul E. Steiner (57) ABSTRACT

A method is provided for processing a remote request by a local processor. The method includes the steps of receiving a remote request from a remote node over a network by a remote aware software driver interface and modifying the remote request with a software converter to emulate a local request which can be processed by the local processor. The method also includes the step of verifying that the remote request can be serviced by the local processor and executing the remote request by the local processor.

17 Claims, 8 Drawing Sheets

I2O ISM IMPLEMENTATION FOR A SAN BASED STORAGE SUBSYSTEM

BACKGROUND OF THE INVENTION

The present invention relates generally to computers, and more particularly to communications between interconnected computer nodes, storage subsystems, and other network devices.

Assessments of server and input/output (I/O) technologies and their respective marketplaces make clear that server-to-server communications and server-to-I/O communications, will be increasingly based on a distributed model. Existing server architectures, based on a shared-address-space model, bus-oriented connections to I/O devices and I/O transactions based on a load/store memory model, have limitations.

A message-passing network system typically can include a plurality of host units interconnected via a network. Host units are intelligent devices attached to the network, used to communicate with other host units. In normal operations, the host unit interacts with I/O devices locally attached or I/O devices attached to remote host units.

Figure 1:
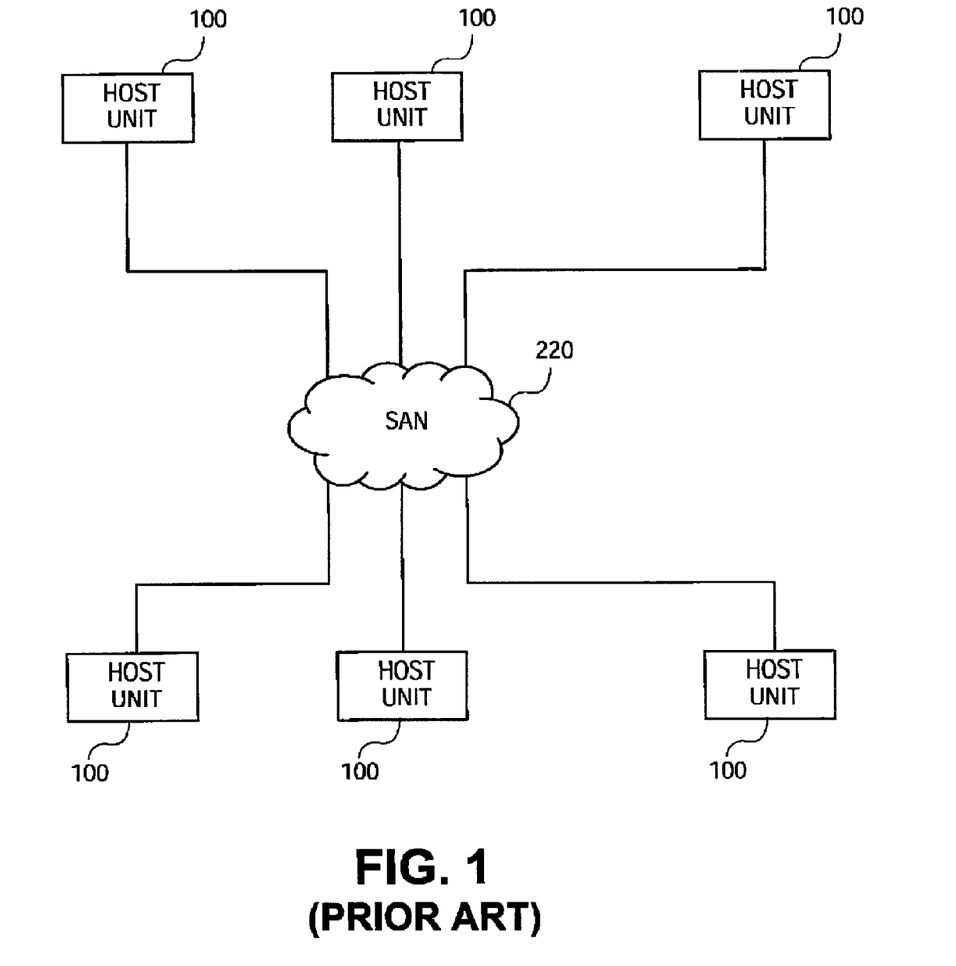
FIG. 1 is a block diagram of a message passing system.

FIG. 1 illustrates a general architecture for a message-passing network system. The message-passing network system in FIG. 1 includes a plurality of host units or nodes 100. Each host unit 100 is connected to a network 220 in order to communication with each other. In particular, network 220 includes links and one or more switches for routing requests using its defined link protocol between the host units 100. This defined link protocol can be, for example, in the form of packets or cells. Each host unit 100 can be any type of computer or computing device, such as a server, a personal computer (PC), a mainframe computer, a workstation, etc. and may contain one or more I/O devices, such as a SCSI controller or hard disk drive, a tape drive, a Peripheral Component Interconnect (PCI) compatible device, or other I/O device.

Figure 2:
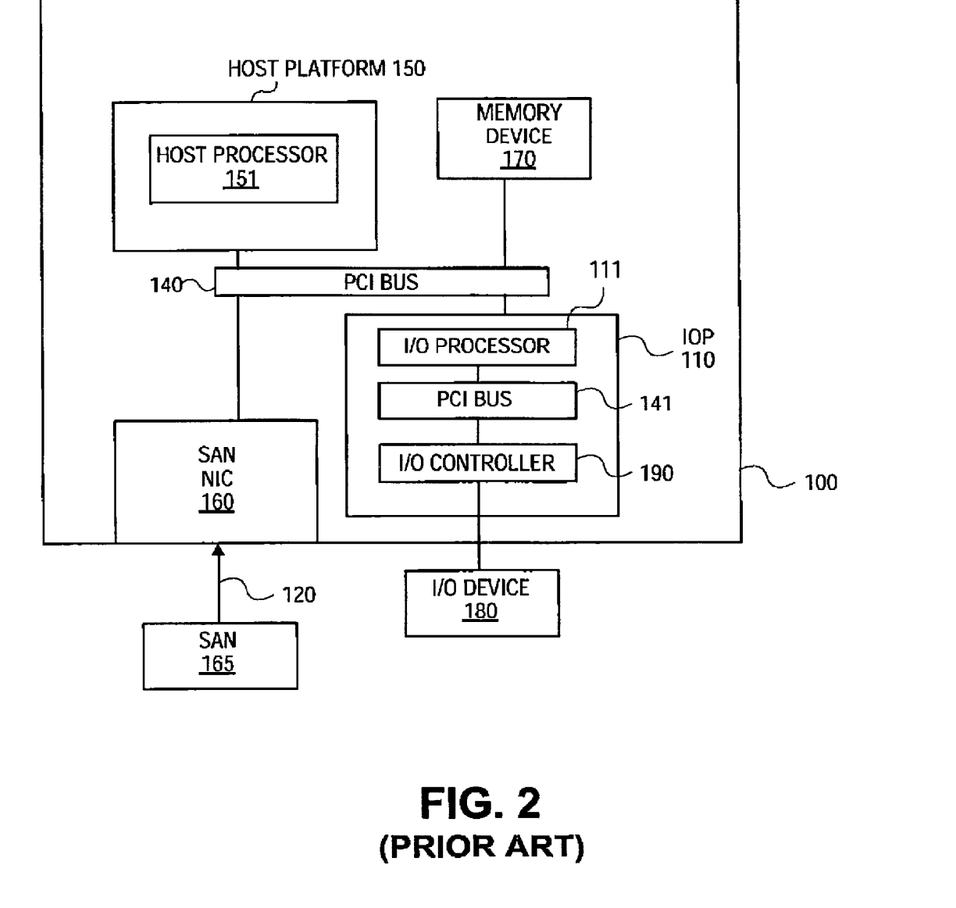
FIG. 2 is a block diagram illustrating a general architectural model for a host unit.

Referring now to FIG. 2, FIG. 2 illustrates the general architecture for network-based host unit 100. Host unit 100 includes a host platform 150 with one or more host processors 151 and an I/O platform (IOP) 110. IOP 110 includes one or more I/O processors 111, I/O devices 180 and other local I/O resources. Each IOP 110 has access to a storage element such as a memory 170. In FIG. 2, a remote request is transmitted using path 120 across a system network such as a system area network (SAN) 165 and is received by a SAN network interface card (SAN NIC) 160. The incoming remote request is initially processed by SAN NIC 160 and then passed across a primary peripheral component interconnect (PCI) bus 140 into memory 170. The remote request is then retrieved by host platform 150 for further processing. Host processor 151 is equipped with a host based network operating system (NOS) used to retrieve the remote request and a local operating system service module (OSM) to process the request.

After processing by the OSM, the remote request is forwarded to IOP 110 via primary PCI bus 140. 1/0 processor 111 includes a hardware device module (HDM) used to further process the request. Afterwards, the remote request is directed across a secondary PCI bus 141 to an I/O controller 190. I/O controller 190 completes the processing of the request by moving data directly from attached I/O device 180, e.g., a hard disk drive, across bus 140 and 141 to memory 170. The data is then gathered by the host platform 150 from memory 170 and sent out to the SAN NIC 160 across the primary PCI bus 140 for delivery. Data retrieved from the processed request is transferred multiple times across the PCI buses to and from host platform 150, memory 170, IOP 110 and I/O controller 190.

This repetitive transfer of data reduces the overall processing efficiency and speed of the network system. Moreover, there are limitations on the number of electrical loads which may be placed on a PCI bus and the physical distance at which I/O devices can be placed.

SUMMARY OF THE INVENTION

According to an embodiment of the present invention, a remote request is received from a remote node over a network by a remote aware software driver interface. The remote request is modified with a software converter to emulate a local request which can be processed locally.

DETAILED DESCRIPTION

Introduction

The distributed computer network system according to an embodiment of the present invention allows host units to remotely access one or more I/O devices included in or attached to an I/O unit. An I/O unit is an autonomous system including one or more processors, a memory, one or more IOPs and other local I/O resources. The fact that the I/O devices are located remote from the host unit is transparent to the host unit and the I/O devices through an intermediate software module (ISM) which acts as an interface for remote services to the computer network as well as a local interface for local services. The ISM is separated into two components: a remote aware software driver interface interfacing with the network, and a software converter that processes received encapsulated remote requests and converts the encapsulated remote requests into pseudo local requests for processing by a local target I/O device. Each remote request received by the ISM is verified to be a remote request encapsulated with a Virtual Interface (VI) network protocol wrapper. The software converter of the ISM strips off the VI wrapper exposing the remote request issued by the remote host unit. The ISM then creates a pseudo local request having the same request details as remote request except that local proxy data buffers are assigned to the new request to act as local intermediate storage for the new request. The new request is then issued to the target I/O device for processing. The target I/O device is not aware that the new request is actually from the remote host unit.

Split Driver Architecture Overview

The communication model for an Intelligent I/O (I₂O) open architecture is a message-passing system. The communication model is analogous to a connection-oriented networking protocol of the Opened System Interface (OSI) layered model, in which two entities exchange messages by using a message layer to set up a connection and exchange data and control.

Figure 3:
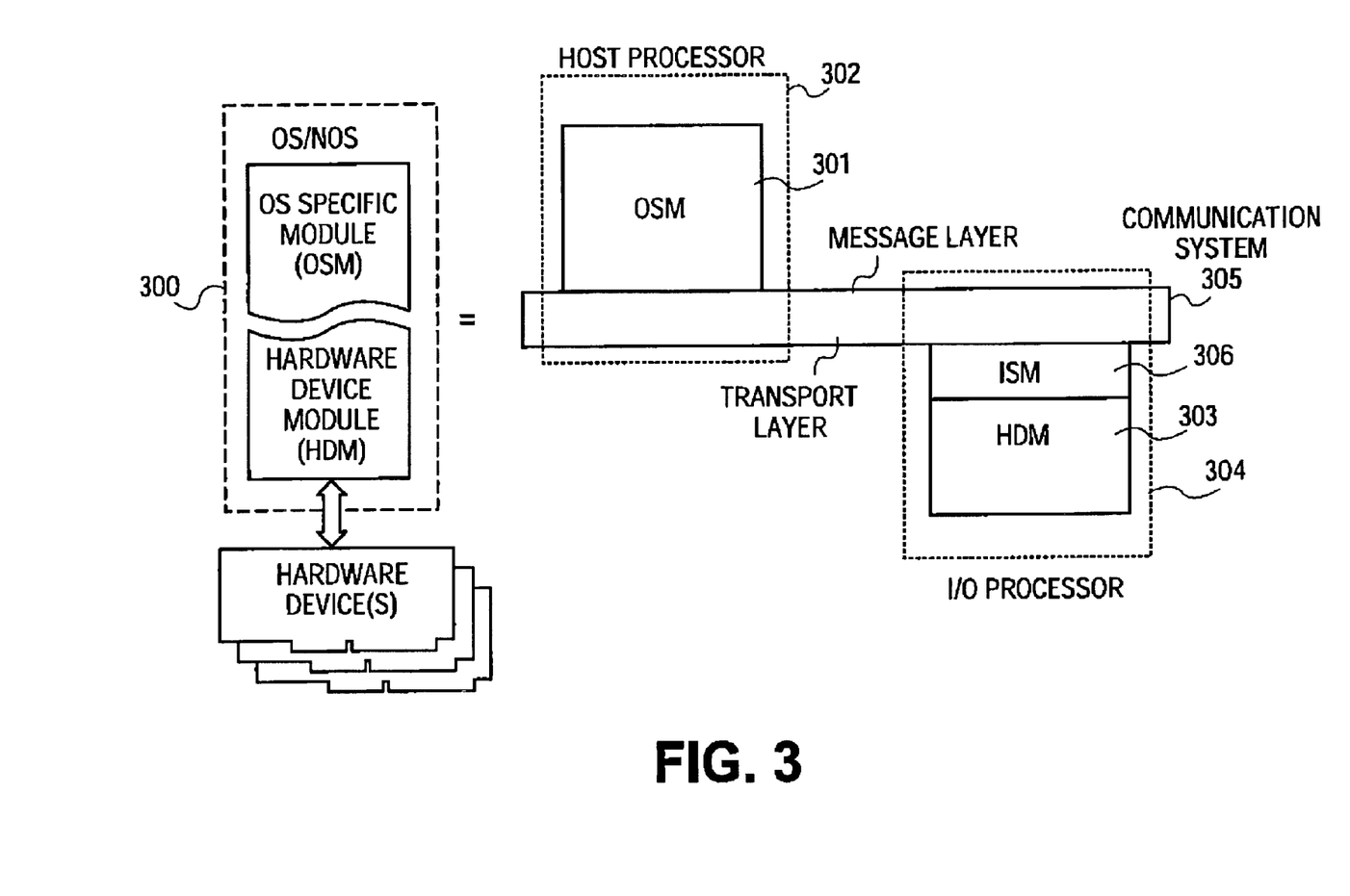
FIG. 3 is a block diagram of a split driver model according to an embodiment of the present invention.

FIG. 3 shows an $I_2O$ open architecture for developing device drivers in a message passing network system environment. The architecture is independent of the operating system (OS), host processor platform, and system I/O bus. The $I_2O$ architecture defines an environment for creating device drivers that are functionally divided between a host operating system and an intelligent IOP. The intelligent IOP is designed to process I/O requests and includes an I/O processor, memory and I/O controller.

The current trend for high end networking and storage technology pushes more functionality from the central processing unit (CPU) of host processor to low-level device drivers, while demanding higher performance from these devices. Thus, these devices now contain their own I/O controllers for processing I/O transactions, such as RAID controllers for storing information and asynchronous transfer mode (ATM) controllers for networking. This arrangement reduces host CPU utilization and also export interrupts, which disrupt application processing, to an environment that more effectively handles I/O requirements.

A driver is defined as software which provides instructions for reformatting or interpreting software commands for transfer to and from peripheral devices such as I/O devices and the CPU of a host unit. According to an embodiment of the present invention, a split driver model is located partly in both the I/O units and partly in the host units.

The $I_2O$ architecture creates drivers that are portable across multiple operating systems (OS) and host platforms. With the proliferation of network OSs, most notably, NetWare 4, Windows NT Server, and Unix Ware, the number of drivers that must be written, tested, integrated and supported has escalated. Through the split driver model, $I_2O$ significantly decreases the number of drivers required. OS vendors only have to write a single $I_2O$-ready driver for each class of device, such as a disk adapter, and device manufacturers only have to write a single $I_2O$-ready driver for each device which will work for any OS that supports $I_2O$. Splitting the device driver into class-specific regions and defining a standard message-passing interface between the two resulting regions (or modules) means that these regions can be physically separate. The modules can be executed on different processors and even in different operating environments.

As shown in FIG. 3, split driver 300 produces two modules, an OS-specific module (OSM) 301 residing on a host processor 302 and a hardware device module (HDM) 303 residing on the I/O processor 304. OSM 301 resides on and interfaces to the host OS. HDM 303 resides on and interfaces with I/O devices managed by an I/O controller. These modules interface with each other through a communication system 305 having two layers: a message layer which sets up a communication session, and a transport layer which defines how information will be shared. Much like a standard communications protocol, the message layer resides on the transport layer.

An intermediate service module (ISM) 306 is located between OSM 301 and HDM 303. ISM 306 adds further functionality between OSM 301 and HDM 303 by acting as a transparent layer between the two modules. From the viewpoint of HDM 303, an ISM has the appearance of OSM 301 and from the view point of OSM 301, the ISM behaves exactly like HDM 303. ISM 306 exits on the HDM side of communication system 305. ISM 306 provides for the use of preexisting HDMs that only support local $I_2O$ requests.

According to an embodiment of the present invention, ISM 306 has the ability to act as a remote service on a network such as a system area network (SAN) as well as a local service for interfacing with HDMs. ISM 306 is logically separated into two main components: a non-$I_2O$ portion that acts as a software interface with the physical layer of a SAN, and an $I_2O$ portion that processes a received encapsulated $I_2O$ request and converts the request into a pseudo local $I_2O$ request for processing by the HDM. Each message received by ISM 306 is verified to be a remote $I_2O$ request encapsulated with the VI SAN protocol wrapper. Thus, a remote host unit can communicate with one or more I/O devices via a SAN using, for example, the techniques employed by ISM 306 according to an embodiment of the present invention and described in greater detail later.

For local message passing, OSM 301 is presented with a request from the host OS. OSM 301 translates the request into an $I_2O$ message and dispatches it to the appropriate HDM 303 for processing. Upon completion of the request, HDM 303 dispatches the result back to OSM 301 by sending a message through the $I_2O$ communication system. To the host OS, OSM 301 appears just like any other device driver.

Communication system 305 defines an open, standard and neutral-format mechanism for communication between the modules, providing the foundation for $I_2O$-based intelligent I/O platform. Acting as the glue that connects the framework of the $I_2O$ driver model, communication system 305 manages and dispatches all requests, and provides a set of application programming interfaces (API) for delivering messages along with a set of support routines that processes them.

Architectural Overview

Figure 4:
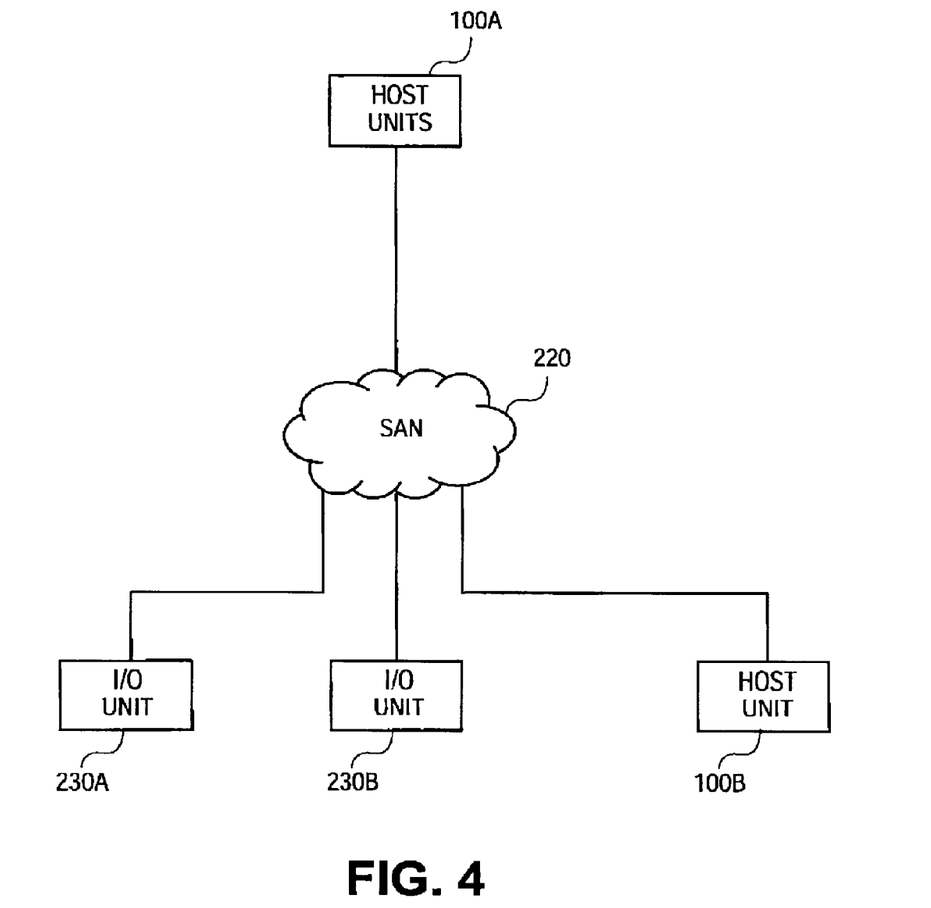
FIG. 4 is a block diagram of an embodiment of an architectural model for a message-passing network system according to the principles of the present invention.

FIG. 4 illustrates a general architecture for a message-passing network system according to the principles of an embodiment of the present invention. The message-passing network system in FIG. 4 can be illustrated as including one or more host units 100 (e.g., servers, workstations, personal computers, or the like), including host unit 100A and 100B. Also included is a plurality of I/O units 230 including I/O unit 230 A and 230 B. Each host unit 100 can communicate with other host units or an I/O unit via system area network (SAN) 220 that includes a layered architecture, having a network layer, a data link layer and a physical layer.

For, outbound transactions (e.g., information or a request from host 100A to I/O unit 230A), the request is encapsulated in a virtual interface (VI) SAN protocol wrapper for transmission over the SAN 220. This encapsulated request is received by the software interface of the ISM. The ISM strips off the VI SAN protocol wrapper, exposing the request issued by host unit 100A. The software converter converts the transaction into a pseudo local request for processing by the target I/O device connected to or attached to I/O unit 230A. New request proxy data buffers are assigned to the pseudo local request to act as local intermediate storage for the request. For inbound transactions (e.g., information or a response from the target I/O device to host unit 100A), the ISM receives the reply from the target I/O device and creates an I/O reply that is encapsulated in the VI SAN by the software interface and returned to host unit 100A for processing.

Operation of the I/O Unit

An I/O unit is an autonomous system including one or more processors, memory, one or more IOPs and other local I/O resources. According to an embodiment of the present invention, message-passing typically may include one or more host units interconnected to one or more I/O units.

Figure 5:
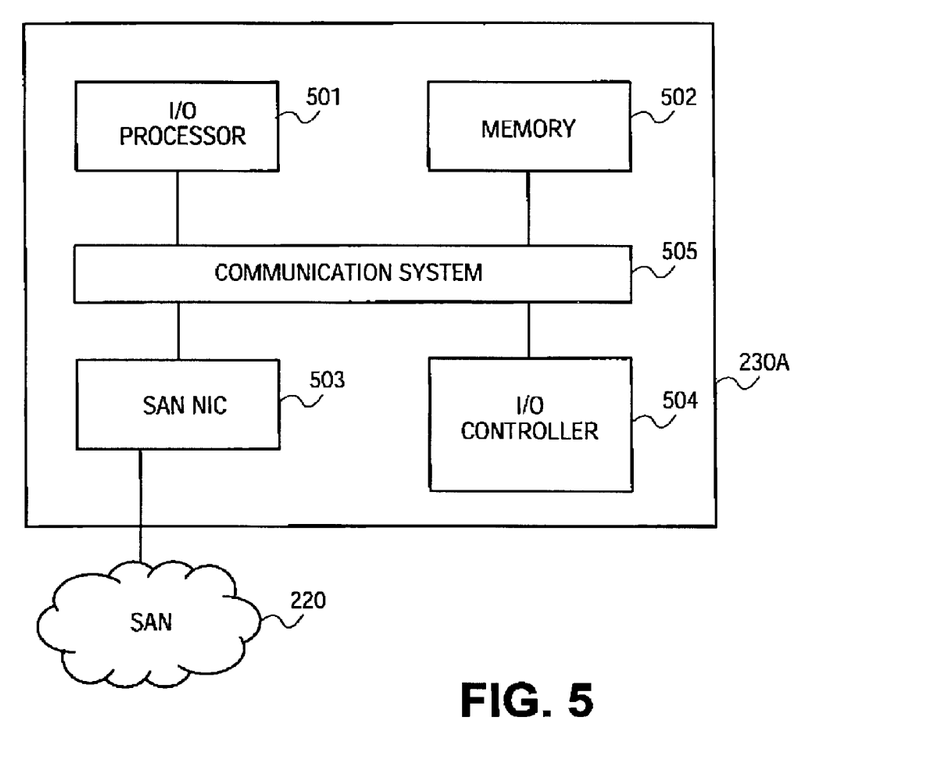
FIG. 5 is a block diagram of an I/O unit according to an embodiment of the present invention.

FIG. 5 shows a split driver model incorporated in an I/O unit for receiving remote requests according to the principles of an embodiment of the present invention. I/O unit 230A includes an I/O processor 501, a memory 502, a SAN NIC 503, an I/O controller 504 and a communication system 505 used for exchanging remote requests. I/O processor 501 includes an ISM. The ISM includes a remote aware software driver interface and a software converter. According to one embodiment of the present invention, the remote aware software driver interface and the software converter are used to process remote requests from a remote host unit 100A. According to FIG. 5, remote host unit 100A forwards a remote request using its host operating system and OSM. This remote request is encapsulated with a Virtual Interface (VI) protocol wrapper when sent across a network such as a SAN 220 to I/O unit 230A. The, encapsulated remote request is received by SAN NIC 503. The remote request is moved into memory 502 via communication system 505. The remote aware software driver interface receives the remote request, strips off the VI protocol wrapper and exposes the remote request issued by remote host unit 100A. The unwrapped remote request is then forwarded to the software converter. The software converter then modifies the remote request. This modification includes changing an initiator address field and a SGL field of the remote request such that a target device believes it is processing a local request. The software converter creates a pseudo local request having the same request details as the remote request except that local proxy data buffers are assigned to the pseudo local request to act as a local intermediate storage for the pseudo local request.

The pseudo local request can then be issued to a targeted I/O device as if it were a local request. An HDM residing on the targeted I/O device does not have any information that the request is actually from remote host unit 100A. Once the request has been processed, the ISM would receive a reply from the HDM. This reply is forwarded to the software converter for conversion processing, and the remote aware software driver interface creates a reply that is encapsulated into a VI protocol wrapper and returned to remote host unit 100A.

Figure 6:
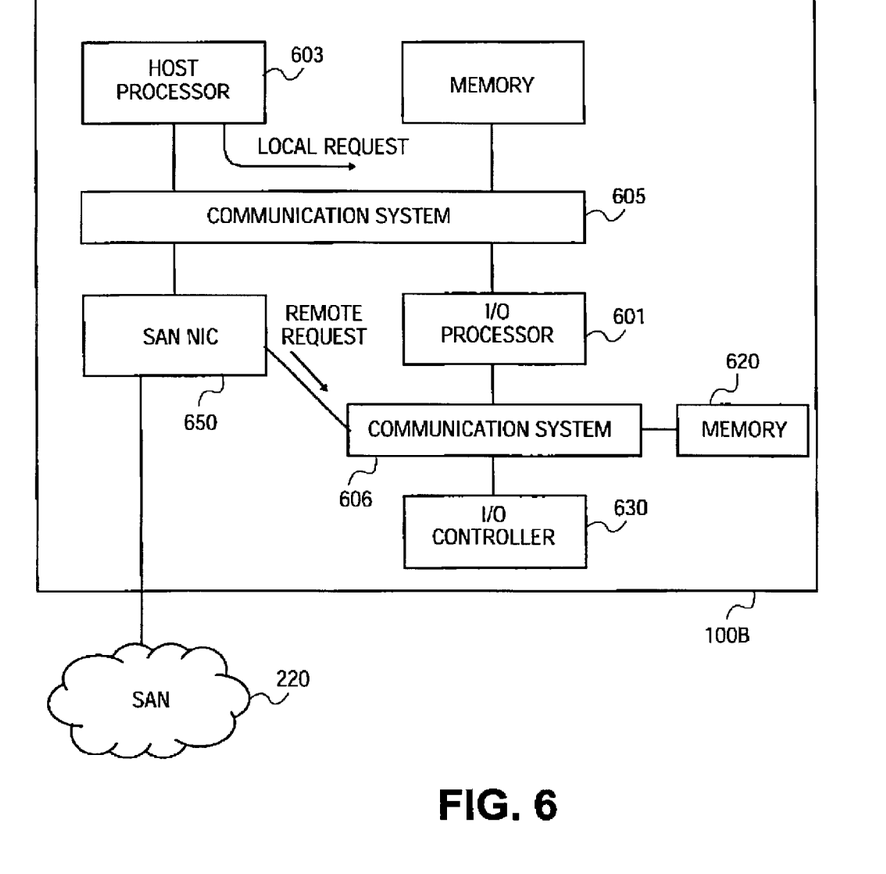
FIG. 6 is a block diagram of a host unit according to an embodiment of the present invention.

FIG. 6 is an alternative embodiment of the present invention. FIG. 6 shows a split driver model incorporated in a host unit for receiving both local and remote requests according to the principles of an embodiment of the present invention. Host unit 100B includes a local host processor 603 having an OSM operating thereon. Host unit 100B further includes communication systems 605 and 606 used for managing and dispatching both local and remote requests. Communication systems 605 and 606 may be a wide variety of types of I/O or peripheral buses, such as a PCI bus. Host unit 100B also includes an I/O processor 601 including an ISM, a SAN NIC 650, an I/O controller 630 and a memory 620. ISM includes a remote aware software driver interface and a software converter. According to FIG. 6, local requests are generated by the host operating system and local OSM of host processor 603, and sent across communication system 605. The local request is forwarded to a target device via I/O processor 601 and I/O controller 630 for processing.

As for remote requests, remote host unit 100B handles remote requests as explained with respect to FIG. 5. Thus, remote requests are received by SAN NIC 650 and forwarded to I/O processor 601 for processing via communication system 606.

Figure 7:
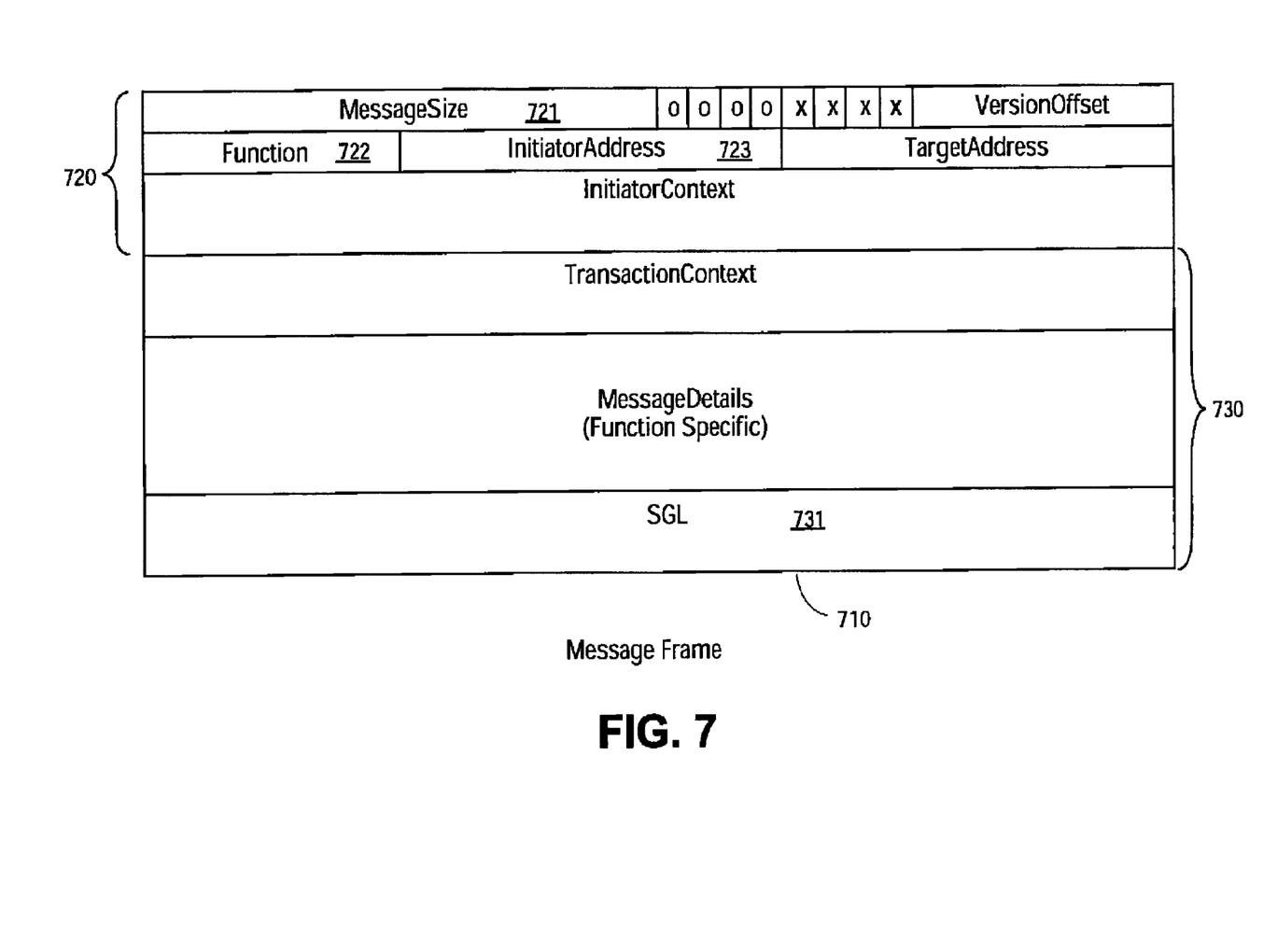
FIG. 7 illustrates an example of a message frame according to an embodiment of the present invention.

FIG. 7 illustrates an example of a request in the form of a message frame 710 created by a remote host unit according to an embodiment of the present invention. The message frame 710 includes a message header 720 and a message payload 730. Message header 720 includes several fields, such as a message size field 721, a function field 722 and an initiator address field 723. Other fields may also be included.

The initiator address field 723 designates a unique identifier of the initiator of the request. The initiator address indicates a target ID for the requested device. In other words, the target ID is the logical address of the service registered with a message layer of the communication system and is used to deliver the reply message from the requested device. For local requests (i.e., requests sent from a host unit or I/O unit to an attached I/O device located on the host unit or I/O unit), the initiator address 723 indicated that a local request is being conducted. According to one of the features of an embodiment of the present invention,however, for remote requests, the initiator address field includes the address of a remote unit. Therefore, the software converter modifies the initiator address field such that the field indicates a local address field assigned to the I/O drivers. Thus, the request can be processed locally. The message payload 730 includes several fields including a scatter-gather list (SGL) 731. The SGL identifies source data and/or reply buffers.

Figure 8:
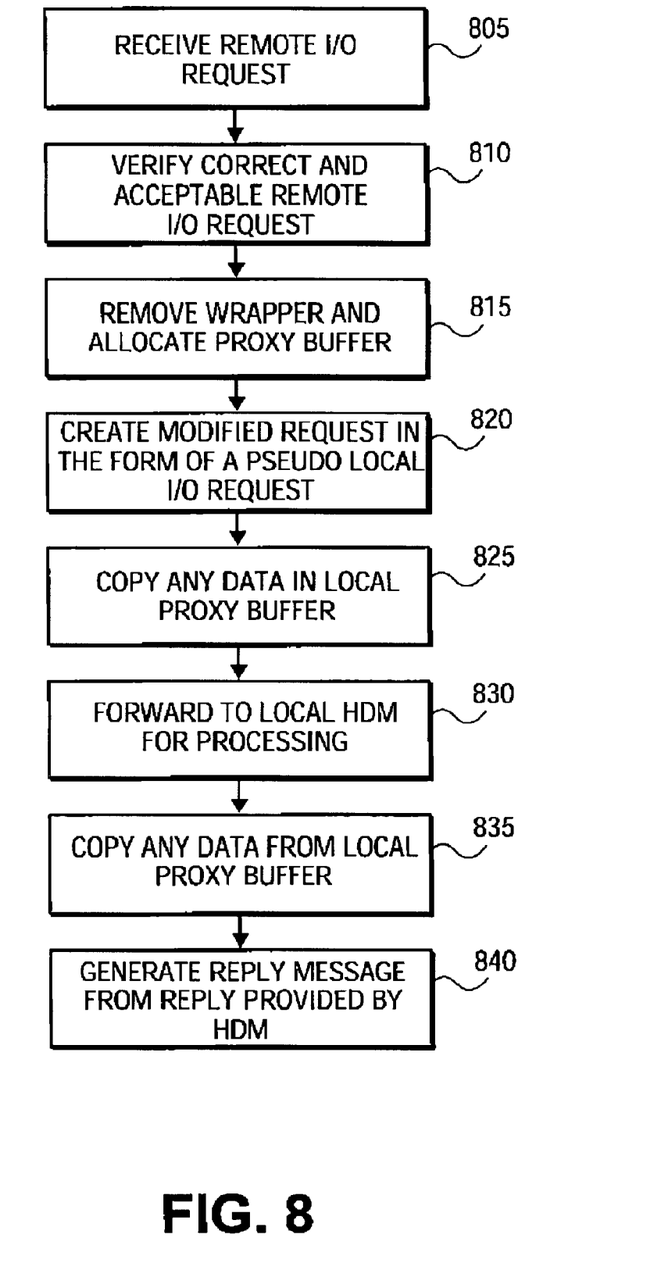
FIG. 8 illustrates a flow chart describing message passing from a host unit to an I/O unit according to an embodiment of the present invention.

FIG. 8 illustrates a flow chart describing the flow from a host unit 100A to an I/O unit 230A as shown in FIG. 4 and according to an embodiment of the present invention. Referring to FIG. 8, at step 805, a SAN NIC within an I/0 unit receives an incoming remote request via a SAN 220. The remote I/O request is in the form of a message wrapped in a SAN transport protocol wrapper used to transmit the request from the host unit 100A to the I/O unit 230A through the SAN 220. The message includes a message frame 710 as shown in FIG. 7 having a header and a payload. The message frame 710 is used to direct the message and supply information.

At step 810, the remote request is checked to ensure that no errors occurred during transmission and then verified to determine if this remote request can be serviced by a local HDM of the targeted I/O device attached to the I/O processor of I/O unit 230A. If the remote request cannot be serviced locally, an error reply is generated and returned to the requesting host unit 100A.

At step 815, if the request can be serviced locally, a remote aware software driver interface unwraps the remote request and allocates a proxy buffer for the valid remote request.

At step 820, a software converter modifies the unwrapped remote request and creates a pseudo local request. This pseudo local request is designed to emulate a local request and is created by modifying the initiator address field 723 of the header 720 and the SGL field 731 of the payload 730 (see FIG. 7)

At step 825, if the pseudo local request is a written request and requires incoming data, the data is copied into the local proxy buffer from the remote host unit 100A across the SAN 220. Otherwise, at step 830, the pseudo local I/O request is forwarded to the local HDM for processing. After the local HDM processes the modified request, any data that must be returned to the remote host as a result of the request is copied by direct memory access (DMA) across SAN 220 and the HDM issues a reply to be returned to the host unit 100A.

At step 835 any data from the local proxy is copied, and at step 840 a reply message is generated by the HDM.

According to one embodiment of the present invention, a plurality of I/O units are located remotely from one or more host units. Host units and I/O units are interconnected via a system area network (SAN). In this manner, more I/O devices can be connected to a CPU than presently permitted by bus loading limitations. Moreover, an embodiment of the present invention permits a distributed architecture in which I/O devices are remotely located from the host unit and located on IOPs of I/O units. One embodiment of the present invention allows I/O message passing through a network from remote devices. In particular, a remote request is wrapped in a packet, transmitted to a destination point, modified at the destination point to appear as a local request and then locally processed.

Several embodiments of the present invention are specifically illustrated and/or described herein. However, it will be appreciated that modifications and variations of the embodiments of the present invention are covered by the above teachings and within the purview of the appended claims without departing from the spirit and intended scope of the invention.

What is claimed is:

1. A method, comprising:

receiving an encapsulated request from a remote node over a network, wherein said encapsulated request is encapsulated with a protocol wrapper;

verifying the encapsulated remote request can be serviced by a local processor;

removing the protocol wrapper and creating an unwrapped remote request; and modifying the unwrapped remote request to emulate a local request which can be processed by the local processor, wherein the encapsulated remote request includes a packet having a message frame including a header and a payload, wherein the header includes an initiator address and the payload includes a scatter gathering list, and wherein modifying the unwrapped remote request comprises:

converting the initiator address from a remote address to a local address; and modifying the scatter gathering list.

2. The method of claim 1, further comprising:

creating a reply by the local processor and forwarding the reply to the remote node.

3. The method of claim 1, wherein modifying the unwrapped remote request comprises assigning local proxy data buffer to the unwrapped remote request.

4. The method of claim 1, wherein the network is a system area network (SAN).

5. The method of claim 1, wherein the remote request is received by a remote aware software driver interface.

6. The method of claim 1, wherein the unwrapped remote request is modified by a software converter.

7. A method, comprising:

receiving a request from a remote node over a network, the request including a remote address indicating that the request was initiated remotely;

modifying the request by converting the remote address to a local address stored in a local memory accessible to a local processor to emulate a request which was initiated locally; and processing the request on the local processor using the local address as the initiating address.

8. The method of claim 7, further comprising:

verifying the request can be serviced by the local processor.

9. The method of claim 7, further comprising:

creating a reply by the local processor and forwarding the reply to the remote node.

10. The method of claim 7, wherein the network is a system area network (SAN).

11. The method of claim 7, wherein the request is received by a remote aware software driver interface.

12. The method of claim 7, wherein the request is modified by a software converter.

13. The method of claim 7, wherein the request is encapsulated with a protocol wrapper and wherein modifying the request comprises removing the protocol wrapper and creating an unwrapped request.

14. The method of claim 13, wherein modifying the request comprises assigning local proxy data buffers to the unwrapped request.

15. The method of claim 7, wherein the request includes a packet having a message frame including a header and a payload.

16. The method of claim 15, wherein the header includes an initiator address corresponding to the remote address and the payload includes a scatter gathering list (SGL).

17. The method of claim 16, wherein modifying the request comprises:

converting the initiator address from the remote address to the local address; and modifying said scatter gathering list.

* * * * *